United States Patent [19]
Yamashita

[11] Patent Number: 5,343,302
[45] Date of Patent: Aug. 30, 1994

[54] VIDEO CAMERA WITH IMPROVED SHADING CORRECTION USING CLIPPED PARABOLIC WAVE SIGNAL

[75] Inventor: Masahiro Yamashita, Kanagawa, Japan

[73] Assignee: Sony Corporation, Tokyo, Japan

[21] Appl. No.: 973,740

[22] Filed: Nov. 9, 1992

[30] Foreign Application Priority Data

Nov. 15, 1991 [JP] Japan ................ 3-300816

[51] Int. Cl.$^5$ .................... H04N 5/243; H04N 5/16
[52] U.S. Cl. .................... 348/251; 348/615
[58] Field of Search ............ 358/163, 461, 41, 209; H04N 5/243, 5/16

[56] References Cited

U.S. PATENT DOCUMENTS

| | | | |
|---|---|---|---|
| 3,588,338 | 6/1971 | Dischert | 358/163 |
| 4,562,459 | 12/1985 | Sokei | 358/163 |
| 4,618,892 | 10/1986 | Kawaguchi | 358/163 |
| 4,731,652 | 3/1988 | Yamanaka | 358/163 |
| 5,157,497 | 10/1992 | Topper | 358/163 |
| 5,202,762 | 4/1993 | Fellinger | 358/163 |

FOREIGN PATENT DOCUMENTS

| | | | |
|---|---|---|---|
| 2745102 | 4/1979 | European Pat. Off. | 358/163 |
| 66178 | 5/1980 | Japan | 358/163 |
| 105974 | 5/1986 | Japan | 358/163 |
| 186064 | 7/1989 | Japan | 358/163 |
| 26071 | 2/1991 | Japan | H04N 5/208 |
| 222586 | 10/1991 | Japan | H04N 5/243 |

Primary Examiner—James J. Groody
Assistant Examiner—Chris Grant
Attorney, Agent, or Firm—William S. Frommer; Alvin Sinderbrand

[57] ABSTRACT

A video camera includes a shading correction circuit in which a parabolic wave signal is generated and the level thereof is adjusted in accordance with zoom and iris settings of the camera's optical system. After adjustment, the parabolic wave signal is clipped in accordance with a reference level and the clipped parabolic wave signal is used for correcting the shading of the camera's image signal. The clipping of the parabolic correction signal allows for more accurate shading correction.

8 Claims, 4 Drawing Sheets

VIDEO CAMERA WITH IMPROVED SHADING CORRECTION USING CLIPPED PARABOLIC WAVE SIGNAL

BACKGROUND OF THE INVENTION

1. Field of the Invention

This invention relates to a video camera, and more particularly, is directed to a video camera which has a shading correction circuit.

2. Description of the Prior Art

A conventional color video camera with shading correction circuits will be described with reference to FIG. 6, in which an optical system 1 of the camera is assumed to include mechanisms for zoom and iris adjustment (not separately shown). Light L from optical system 1 is incident on a red charge-coupled device (CCD) 2, a green CCD 3 and a blue CCD 4. Each of the CCDs is of the in-line transfer type in which vertically extending image-sensing stripes and charge transfer stripes are alternately arranged and are adjacent to each other. Vertically extending light-shielding stripes are formed on the charge transfer stripes.

The red, green and blue image signals produced by CCDs 2, 3 and 4 are supplied through preamplifiers 5, 6 and 7 to shading correcting circuits 8, 9 and 10, respectively. Respective corrected video signals are output from shading correction circuits 8, 9 and 10 through video amplifiers 12, 13 and 14 to output terminals 15, 16 and 17.

Shading correction circuits 8, 9 and 10 each have two cascaded integration circuits, which receive horizontal and vertical synchronizing signals from a horizontal and vertical synchronizing signal generator 11. Shading correction circuits 8, 9 and 10 produce respective sawtooth wave signals and parabolic wave signals for the horizontal and vertical periods. Also, each of the shading correction circuits has respective multipliers for receiving the horizontal and vertical period saw-tooth wave signals and parabolic wave signals and multiplying the signals by the color image signal received from the respective preamplifier 5, 6 or 7.

As is well known, shading correction is performed because the intensity of the light provided through the camera's optical system decreases as the distance from the center of the image increases. The parabolic signals referred to above are used for the purpose of compensating for such decrease in light intensity.

For example, FIG. 3 shows light intensity curves at various aperture settings for a wide-angle lens setting. Similarly, FIGS. 4 and 5 show light intensity curves for standard and telephoto lens settings, respectively. In FIGS. 3-5, the horizontal axis shows distance from the center of the image while the vertical axis shows how the light intensity varies with distance from image center relative to the light intensity present at the center of the image. In FIG. 3, curve P10 shows the decrease in light intensity for an F5.6 aperture setting, while curves P11 and P12 are the light intensity curves for F2.8 and F1.7 aperture settings, respectively. It will be seen that curve P11 shows a more rapid decrease than curve P10, and curve P12 decreases still more rapidly than curve P11.

Similarly, as shown in FIG. 4 for the standard lens setting, light intensity curves P20, P21 and P22 are respectively for the F5.6, F2.8 and F1.7 aperture settings. Again, the curves are listed in the order of more rapid decrease in light intensity.

Also, curves P30, P31 and P32 of FIG. 5 are for respective aperture settings F5.6, F2.8 and F1.7 for a telephoto lens setting, and, as before, the curves are listed in order of more rapidly decreasing light intensity.

As can be seen from FIGS. 3-5, the decrease in light intensity from the center toward the periphery of the image, also known as shading, varies with both the lens and aperture settings of the optical system. It should also be noted that all of the light intensity curves shown in FIGS. 3-5 diverge, to a greater or lesser extent, from being parabolic. Accordingly, using precisely parabolic waves as correction signals results in errors in shading correction. The errors in shading correction are particularly significant in the case of the reduction of the light intensity ratio from the periphery to the center of the image caused by aperture eclipse and in the case of f-drop (i.e., reduction of the f-number) at telephoto lens settings. Although it has been proposed to adjust the levels of the parabolic signals before using the signals for shading correction, errors in shading correction remain significant even when such adjustment is used.

OBJECTS AND SUMMARY OF THE INVENTION

Accordingly, it is an object of the present invention to provide a video camera having a shading correction circuit in which shading correction may be performed with high precision, particularly in the case of reduction of the peripheral-to-center light intensity ratio caused by aperture eclipse, and in the case of f-drop at telephoto lens settings.

In accordance with the present invention, a video camera includes an optical system that has a variable optical characteristic, an image pickup that receives light incident thereon from the optical system and generates an image signal, and a shading correction circuit that includes means for generating a parabolic wave signal, means for adjusting the level of the parabolic wave signal in accordance with the optical characteristic of the optical system and for outputting an adjusted parabolic wave signal, limiting means for clipping the adjusted parabolic wave signal in accordance with a predetermined reference level to form a correction signal, and means receiving the correction signal for correcting the image signal in accordance with the correction signal.

A video camera including a shading correction circuit of this type permits shading correction to be performed with a high degree of precision.

The above, and other objects, features and advantages of the present invention will be apparent from the following detailed description thereof which is to be read in connection with the accompanying drawings.

DETAILED DESCRIPTION OF THE PREFERRED EMBODIMENT

Figure 1:
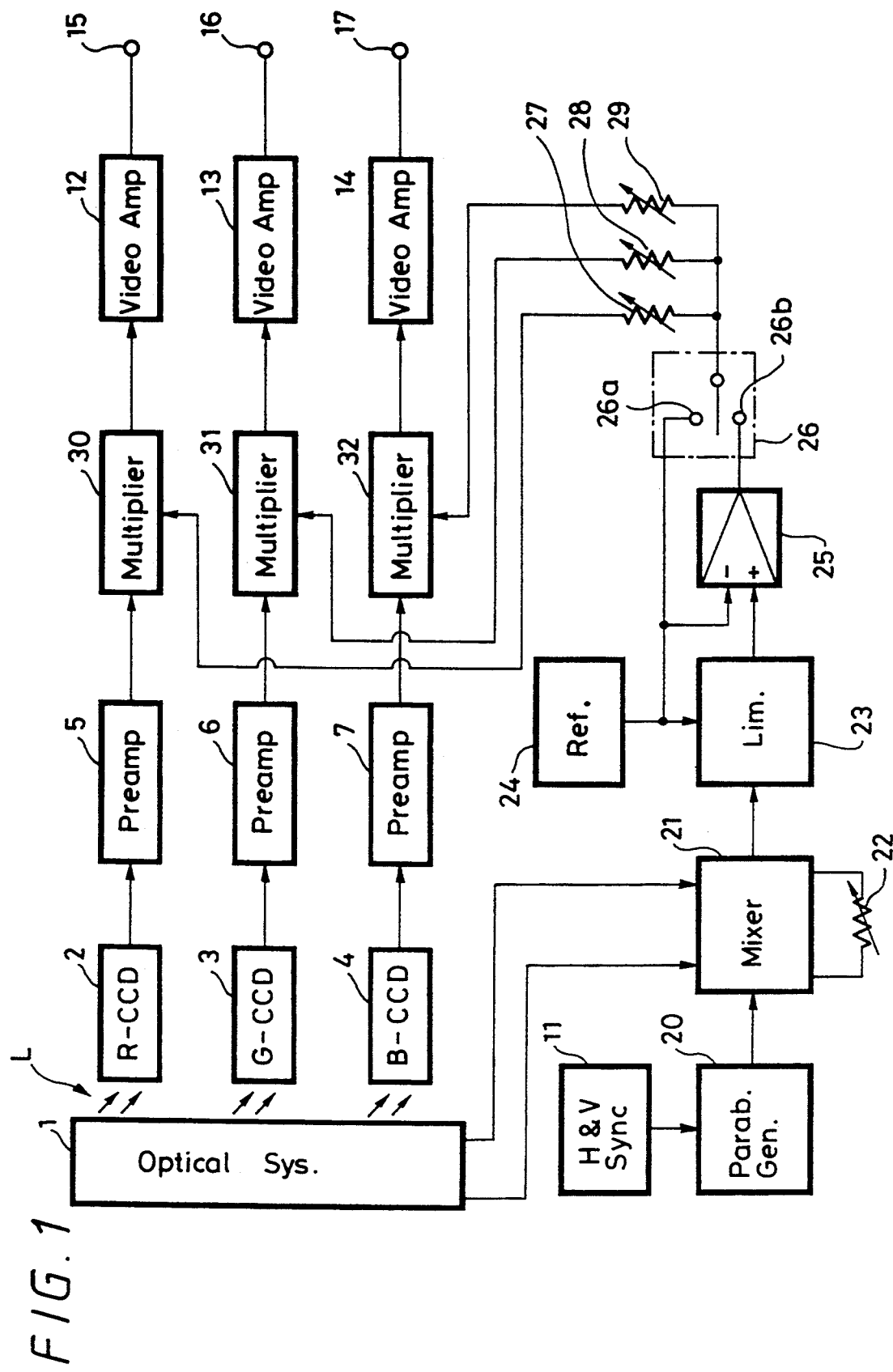
FIG. 1 is a block diagram of a video camera according to the present invention.
Figure 6:
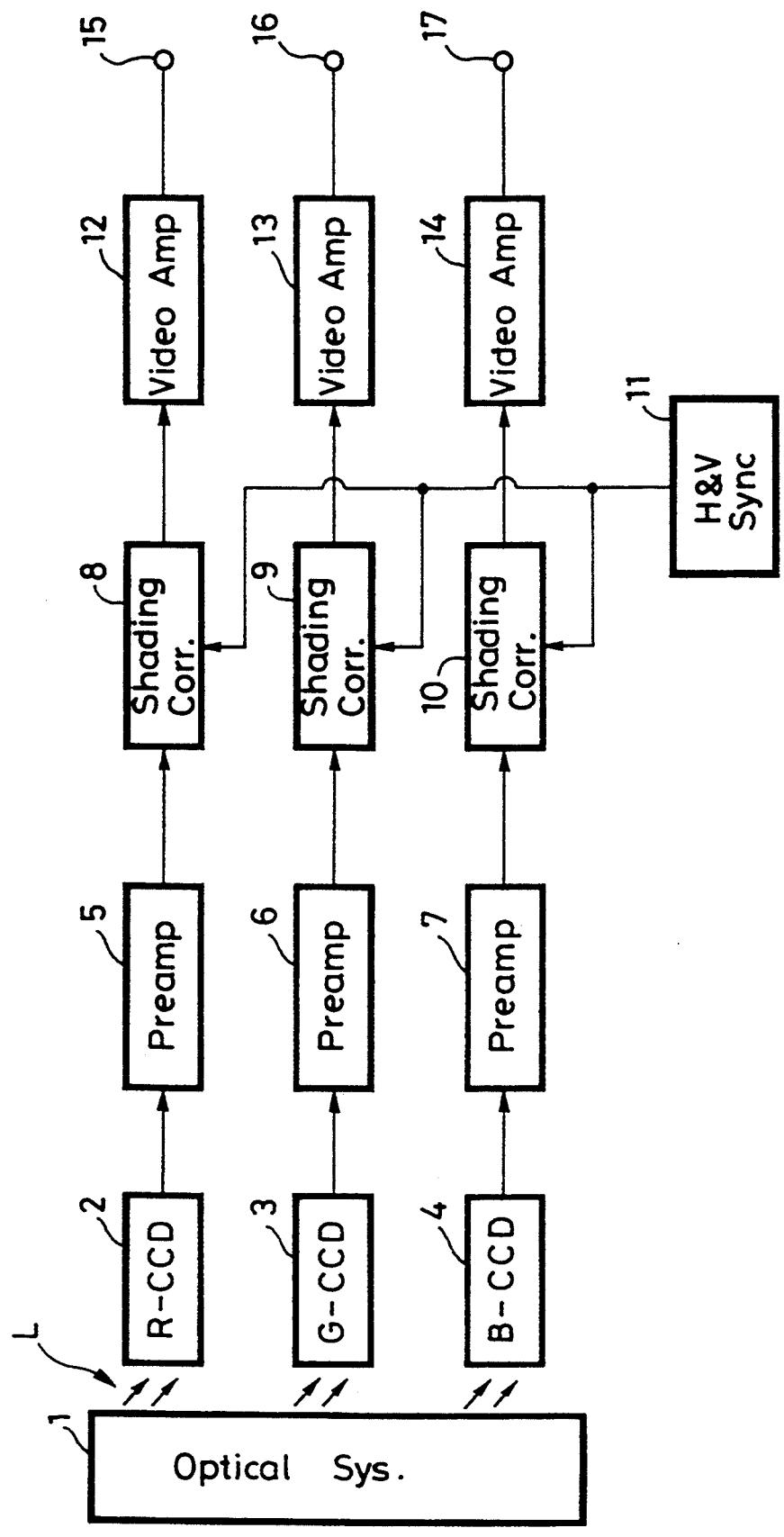
FIG. 6 is a block diagram of a conventional video camera.

Referring to FIG. 1, there will now be described a video camera with a shading correction circuit in accordance with the invention. Elements of FIG. 1 which correspond to those described with reference to FIG. 6 are identified by the same reference numerals and will not be described in detail. Thus, as in the camera of FIG. 6, the camera of FIG. 1 includes red, green and blue CCDs 2, 3 and 4 which receive light L incident thereon from optical system 1 and convert the incident light into electrical signals. The signals from the respective CCDs 2, 3 and 4 are supplied through preamplifiers 5, 6 and 7 to multipliers 30, 31 and 32. Multipliers 30, 31 and 32 receive respective correction signals from adjustment controls 27, 28 and 29 and multiply the color image signals received from preamplifiers 5, 6 and 7 by the correction signals. The resulting multiplied signals are then supplied by the multipliers 30, 31 and 32 to output terminals 15, 16 and 17 via respective video amplifiers 12, 13 and 14.

A horizontal and vertical synchronizing signal generator 11 provides horizontal and vertical synchronizing signals to a parabola generator 20. On the basis of the received horizontal and vertical synchronizing signals, the parabola generator 20 generates a parabolic signal and outputs that signal to a mixer 21. Mixer 21 receives from optical system 1 DC voltages which represent optical characteristics of the optical system 1. These optical characteristics may include, for example, the zoom position setting of the lens and/or the aperture setting (i.e., the iris setting, which will also be referred to as the "iris parameter"). A manual adjustment control 22 is associated with mixer 21. The setting of adjustment control 22 determines a ratio at which the DC voltages from the optical system 1 are mixed by mixer 21. The resulting mixed voltage is then used by mixer 21 to adjust the level of the parabolic signal received from parabola generator 20. The resulting level-adjusted parabolic signal is then output to a limiting circuit 23.

Limiting circuit 23 also receives a reference voltage level from a reference generator 24 in addition to the level-adjusted parabolic signal output by mixer 21. In accordance with the reference level, limiting circuit 23 clips the level-adjusted parabolic signal to form a correction signal that has a waveform such as those shown in FIG. 2.

Figure 2:
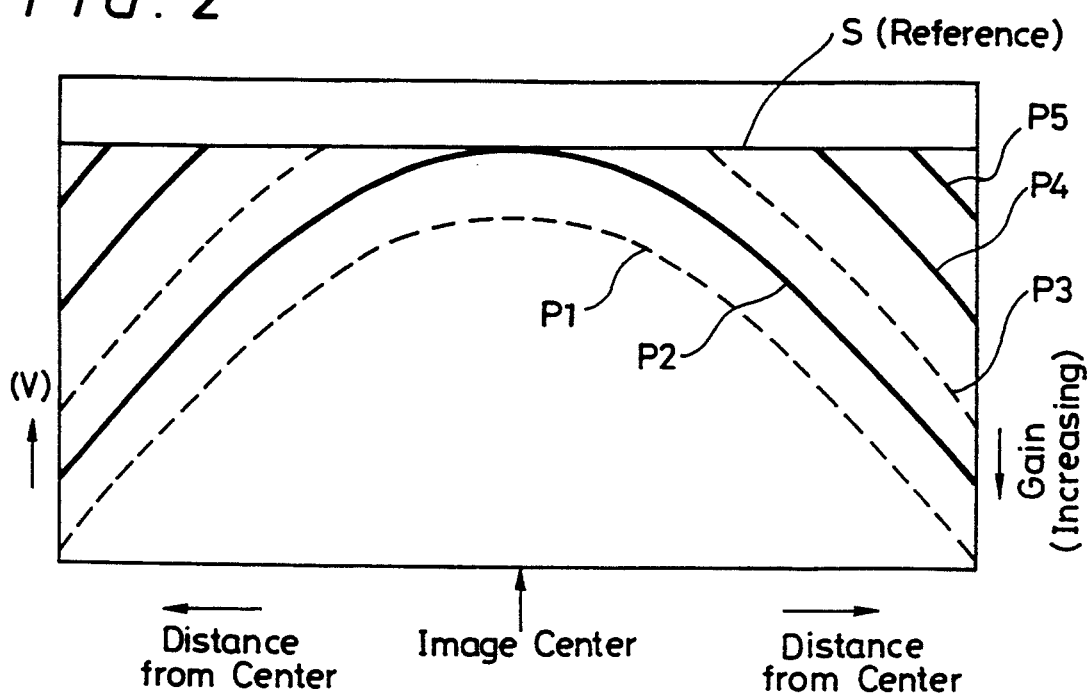
FIG. 2 illustrates waveforms of parabolic wave signals that have been clipped in accordance with the invention.
Figure 3:
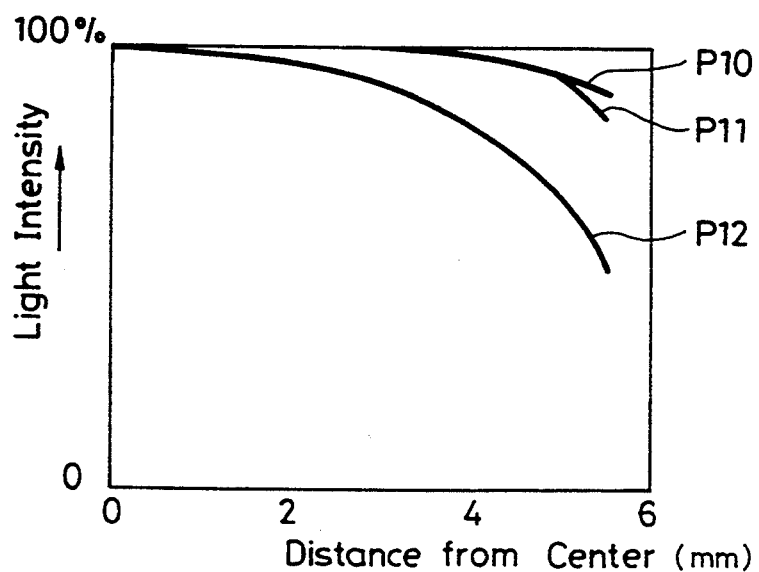
FIGS. 3-5 are graphical illustrations of typical shading characteristics of a video camera optical system at various lens and iris settings.
Figure 4:
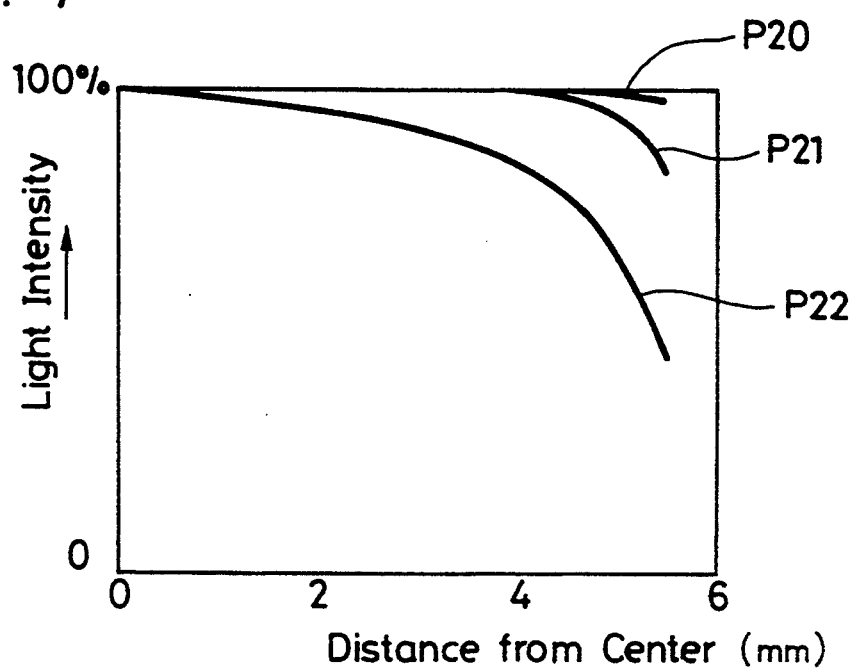
Figure 5:
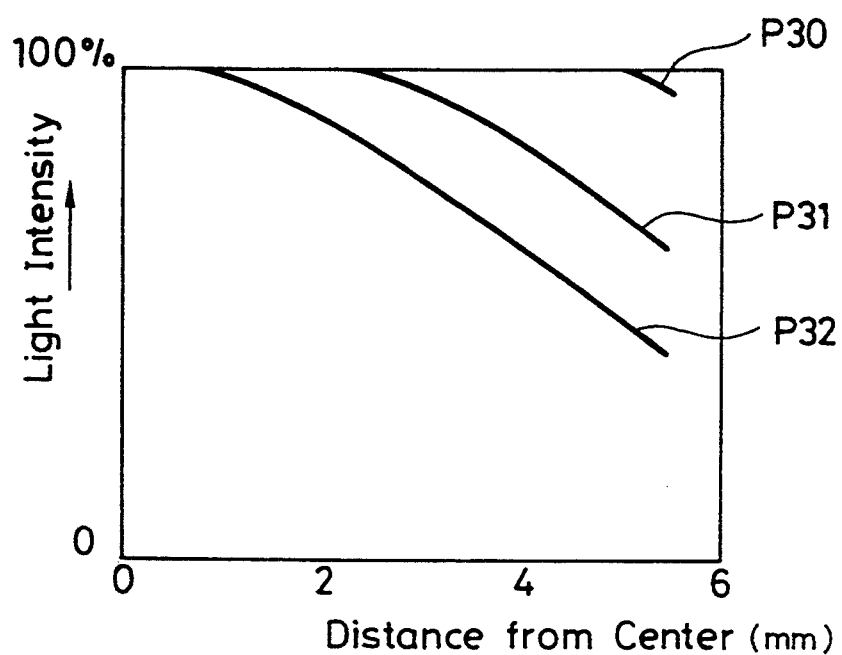

In FIG. 2 the vertical axis represents increasing voltage, and the horizontal axis represents distance in one direction or another from the center of the image. The horizontal line S represents the reference level provided by reference generator 24 and represents a gain of "1" (i.e., no gain) to be applied to the image signals at multipliers 30, 31 and 32. It is to be noted that the gain to be applied to the image signal at each of multipliers 30, 31 and 32 increases by the extent to which a waveform shown in FIG. 2 is below reference level S. Curves P1-P5 shown in FIG. 2 are respectively waveforms of various signals output by limiting circuit 23 in dependence on the signal level of the parabolic signal received by limiting circuit 23 from mixer 21. For example, it will be seen that the signals represented by waveforms P1 and P2 are not clipped because the level of the parabolic signals input to limiting circuit 23 does not, at any point, exceed the reference level S. In the case of the signal represented by waveform P1, the gain to be applied at multipliers 30, 31 and 32 will be greater than 1 even at the center of the image, as would be appropriate to correct for so-called f-drop at a telephoto lens setting. The output signals of limiting circuit 23 represented by curves P3-P5 are clipped in their central portions so as to be flat and equal in the central portions to the reference voltage S.

The signal output from limiting circuit 23 is supplied through an amplifier 25 to an input terminal 26b of a two input/one output switch 26. The reference voltage provided by reference generator 24 is supplied to the other input 26a of switch 26. Switch 26 may be, for example, a manual switch which is to be positioned so as to output the reference voltage when the optical system has inserted therein an extender that doubles the focal distance. In that case, the shading characteristic of the optical system becomes flat, so that shading correction is not necessary.

The signal output from switch 26 is supplied as a correction signal through respective adjustment controls 27, 28 and 29 to multipliers 30, 31 and 32. Adjustment controls 27, 28 and 29, and also adjustment control 22, are manually set each time the shading characteristic of optical system 1 changes, as, for example when the lens is changed. The correction signals provided through adjustment controls 27, 28 and 29 to multipliers 30, 31 and 32 there multiply the image signals received from preamplifiers 5, 6 and 7, respectively. Then, the corrected image signals are output by multipliers 30, 31 and 32 to output terminals 15, 16 and 17 through the respective video amplifiers 12, 13 and 14.

It will be appreciated that the shading correction circuit of the video camera shown in FIG. 1 includes horizontal and vertical synchronization signal generator 11, parabolic generator 20, mixer 21, limiting circuit 23, reference generator 24, amplifier 25, switch 26, adjustment controls 22, 27, 28 and 29 and multipliers 30, 31 and 32. By producing a correction signal that is a clipped parabolic, the correction signal can be precisely matched to the light intensity drop-off toward the periphery of the image so that high precision shading correction can be performed even in the cases of aperture eclipse or f-drop at telephoto lens settings.

It should be noted that limiting circuit 23 may be a conventional limiter, or, alternatively, may be a compression circuit that compresses the input voltage to a constant value.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A video camera including an optical system having a variable optical characteristic, image pickup means receiving light incident thereon from said optical system for generating an image signal, and a shading correction circuit comprising:

means for generating a parabolic wave signal;
   means for adjusting a level of said parabolic wave signal in accordance with said optical characteristic of said optical system, and for outputting an adjusted parabolic wave signal;
   limiting means for clipping said adjusted parabolic wave signal in accordance with a predetermined reference level to form a correction signal; and means for receiving said correction signal and for correcting said image signal in accordance with said correction signal.

2. A video camera according to claim 1; wherein said limiting means comprises a limiter circuit.

3. A video camera according to claim 1; wherein said limiting means comprises a compression circuit.

4. A video camera according to claim 1; wherein said variable optical characteristic corresponds to a zoom position of said optical system.

5. A video camera according to claim 1; wherein said variable optical characteristic corresponds to an iris parameter of said optical system.

6. A video camera including an optical system having a variable optical characteristic, image pickup means receiving light incident thereon from said optical system for generating red, green and blue image signals, and a shading correction circuit comprising:

means for generating a parabolic wave signal;

mixer means including a first manual adjustment means for adjusting a level of said parabolic wave signal in accordance with said optical characteristic of said optical system and in accordance with a setting of said first manual adjustment means, said mixer means outputting an adjusted parabolic wave signal;

reference means for providing a predetermined reference level;

limiting means for receiving said adjusted parabolic wave signal and said predetermined reference level and clipping said adjusted parabolic wave signal in accordance with said predetermined reference level to form a correction signal;

second, third and fourth manual adjustment means for receiving said correction signal and for outputting respective adjusted correction signals; and first, second and third multiplying means for respectively receiving the adjusted correction signals output by said second, third and fourth manual adjustment means and for respectively multiplying said red, green and blue image signals by said adjusted correction signals.

7. A video camera including an optical system having a variable optical characteristic, image pickup means receiving light incident thereon from said optical system for generating red, green and blue image signals, and a shading correction circuit comprising:

means for generating a parabolic wave signal;

mixer means, including a first manual adjustment means, for adjusting a level of said parabolic wave signal in accordance with said optical characteristic of said optical system and in accordance with a setting of said first manual adjustment means, said mixer means outputting an adjusted parabolic wave signal;

reference means for providing a predetermined reference level;

limiting means for receiving said adjusted parabolic wave signal and said predetermined reference level and clipping said adjusted parabolic wave signal in accordance with said predetermined reference level to form a correction signal;

switch means for receiving said predetermined reference level and said correction signal and for selectively outputting one of said predetermined reference level and said correction signal;

second, third and fourth manual adjustment means for receiving said signal output by said switch means and for outputting respective adjusted signals; and first, second and third multiplying means for respectively receiving the adjusted signals output by said second, third and fourth manual adjustment means and for respectively multiplying said red, green and blue image signals by said adjusted signals.

8. A video camera according to claim 7; wherein said switch means is a manual switch.

* * * * *